(12) United States Patent
Rose et al.

(10) Patent No.: US 7,285,216 B2
(45) Date of Patent: Oct. 23, 2007

(54) TREATMENT OF WATER

(75) Inventors: Peter Dale Rose, Grahamstown (ZA); Neil Berthold Rein, Edenvale (ZA)

(73) Assignee: Water Research Commission, Pretoria (ZA)

( * ) Notice: Subject to any disclaimer, the term of this patent is extended or adjusted under 35 U.S.C. 154(b) by 0 days.

(21) Appl. No.: 10/514,915

(22) PCT Filed: May 16, 2003

(86) PCT No.: PCT/IB03/01898

§ 371 (c)(1),
(2), (4) Date: Nov. 15, 2005

(87) PCT Pub. No.: WO03/097541

PCT Pub. Date: Nov. 27, 2003

(65) Prior Publication Data

US 2006/0096917 A1    May 11, 2006

(30) Foreign Application Priority Data

May 17, 2002  (ZA) ................................. 2002/3970

(51) Int. Cl.
*C02F 3/00* (2006.01)
(52) U.S. Cl. ...................... 210/610; 210/611; 210/739; 210/532.1; 210/532.2
(58) Field of Classification Search ........ 210/610–611, 210/739–746, 532.1, 531.2, 532
See application file for complete search history.

(56) References Cited

U.S. PATENT DOCUMENTS 4,664,802 A * 5/1987 Lee ............................ 210/522
6,221,652 B1 * 4/2001 Janssen et al. .............. 435/266

OTHER PUBLICATIONS

Buisman, C. et al. "Kinetics of Chemical and Biological Sulphide Oxidation in Aqueous Solutions" *Wat. Res.* (1990) vol. 24, No. 5, pp. 667-671.
Okabe, S. et al. "Sulfate Reduction and Sulfide Oxidation in Aerobic Mixed Population Biofilms" *Wat. Sci. Tech.* (1998) vol. 37, No. 4-5, pp. 131-138.
Sublette K. L. "Immobilization of Thiobacillus Denitrificans for the Oxidation of Hydrogen Sulfide in Sour Water" *Applied Biochemistry and Biotechnology* (1989) vol. 20/21, pp. 675-686.
Chung, Y.C. et al. "Microbial Oxidation of Hydrogen Sulfide with Biofilter" *J. Environ. Sci. Health* (1996) A31(6), pp. 1263-1278.
Chawan Ongcharit, Y.T. et al. "Novel Immobilized Cell Reactor for Microbial Oxidation of $H_2S$" *Chemical Engineering Science* (1990) vol. 45, No. 8, pp. 2383-2389.

(Continued)

*Primary Examiner*—Chester T. Barry
(74) *Attorney, Agent, or Firm*—Ladas and Parry LLP (57) ABSTRACT

A process for treating sulphide-containing water includes maintaining a steep redox potential gradient in an interface zone of the sulphide-containing water. The water is exposed to an oxygen-containing environment, and the interface zone is located immediately below the surface of the water. Sulphide in the water is biologically oxidized, in the interface zone, to sulphur. The sulphur may be removed by settling, thereby achieving a final removal of sulphur compounds.

24 Claims, 6 Drawing Sheets

OTHER PUBLICATIONS

Buisman, C. et al. "Effect of Organic Substrates on Biological Sulphide Oxidation" *Appl. Microbiol Biotechnol.* (1990) vol. 33, pp. 459-462.

Janssen, A.J.H., et al. "Application of the Redox Potential for Controlling a Sulfide Oxidizing Bioreactor" *Biotechnology and Bioengineering* (1998) vol. 60, No. 2, pp. 147-155.

Buisman, C.P., et al. "Biotechnological Process for Sulphide Removal with Sulphur Reciamation" *Acta Biotechnol. 9* (1989) 3, pp. 255-267.

Buisman, C. J. N., et al. "Optimization of Sulphur Production in a Biotechnological Sulphide-Removing Reactor." *Biotechnology and Bioengineering*, vol. 35 (1990) pp. 50-56.

* cited by examiner

TREATMENT OF WATER

THIS INVENTION relates to the treatment of water. It relates in particular to the treatment of sulphide-containing water. More particularly, it relates to a process and to a reactor for treating sulphide-containing water.

Sulphur and its organic and inorganic derivatives are essential and dynamic components of the natural environment. Acceptable levels of the various oxidized and reduced forms of sulphur are maintained within the environment by a natural sulphur cycle, by means of which a dynamic balance between large, relatively inert sulphur pools such as geological pyrite deposits, sulphate reserves present in the ocean, the volatile sulphur compounds in the atmosphere and the sulphur requirements of living organisms is achieved.

Disturbance of the natural sulphur cycle, often by human activity, results in the mobilization of these sulphur compounds from these relatively inert sulphur pools and the accumulation of unacceptable levels of sulphur compounds in the environment. Sources of sulphur pollution resulting from disturbances of the sulphur cycle include $SO_2$ emission from the burning of fossil fuels and the oxidation of pyrite by microorganisms in disused mines resulting in Acid Mine Drainage (AMD). A bacterial community, referred to as the "Sulfuretum" is the ecological community of sulphide oxidizing and sulphate reducing bacteria responsible for the continuous cycling of sulphur compounds and can be regarded as the coupling of living biomass formation and the subsequent decomposition and remineralization of the biomass.

Sulphate reducing bacteria reduce sulphur compounds in the presence of a suitable electron donor to produce sulphide as an end product, and sulphide oxidizing bacteria oxidize sulphur products in the presence of a suitable electron acceptor to produce sulphate as an end product.

The bacteria of the natural sulphur cycle can be utilized in biotechnological applications to re-establish the balance in the sulphur cycle in areas where human activity has resulted in the over accumulation of specific sulphur compounds. Wastewaters high in sulphate may be treated using a process utilizing sulphate reducing bacteria, shifting the sulphur cycle towards the sulphide side of the cycle. Sulphide, being a highly toxic substance, must be removed from the water. The present invention provides a means of removing sulphides from water.

During gold mining operations rock is removed in order to gain access to the ore body, creating a large system of well ventilated underground workings that expose rock that is usually under anaerobic conditions to aerobic conditions. If the rock contains pyrite, microbes are able to oxidize the pyrite in the presence of oxygen according to the following equation:

$$FeS_2 + 14Fe^{3+} + 8H_2O \rightarrow 15Fe^{2+} + 2SO_4^{2+} + 16H^+ \quad (1)$$

During mining operations water is actively pumped out of the mine, but when mining ceases the mines flood and water flows out carrying the products of pyrite oxidation namely iron, sulphate and acidity. Hence a large quantity of previously inert sulphide (in the form of pyrite) is mobilized in the form of soluble sulphate accompanied by acidity and quantities of metals, particularly iron. The resulting outflow of acidic, sulphate and metals rich water is referred to as Acid Mine Drainage (AMD). AMD is a long term pollution problem where outflows from disused mines may have elevated metals and sulphate concentrations for up to 100 years. A biotechnological approach to treating AMD is bacterial sulphate reduction in the presence of a suitable electron donor and carbon source for bacterial growth, in accordance with reaction (2).

$$SO_4^{2-} + H^+ + 2CH_2O \rightarrow HS^- + 2H_2O + 2CO_2 \quad (2)$$

AMD can, for example, be treated passively in a degrading packed bed reactor, which uses lignocellulosic material as a carbon source.

The treatment of high sulphate-containing waters using sulphate reducing bacteria thus results in the production of hydrogen sulphide. Hydrogen sulphide is a pollutant that must be removed from the environment due to its toxicity, corrosive properties and its characteristic rotten egg smell. Any water that is to be discharged into the natural environment requires treatment to remove the sulphide.

Hydrogen sulphide ($H_2S$) is a weak acid which dissociates into $HS^-$ ($pK_{a1} = 7.04$) and $S^{2-}$. The term "sulphide" is commonly used for any of the species that may be present. The two most important biologically relevant oxidation reactions which sulphide may undergo are:

$$2HS^- + O_2 \rightarrow S^\circ + 2OH^- \, \Delta G^{\circ\prime} = -129 \text{ k J./mol HS}^- \quad (3)$$

$$2HS^- + 4O_2 \rightarrow 2SO_4^{2-} + 2H^+ \, \Delta G^{\circ\prime} = -772.43 \text{ k J/mol HS}^- \quad (4)$$

These are overall equations for oxidation of sulphide.

The chemical oxidation of sulphide by oxygen is a relatively slow process at low oxygen concentrations allowing bacteria to compete kinetically with chemical oxidation at low oxygen concentrations. At high oxygen concentrations, the oxidation of sulphide proceeds directly to thiosulphate and sulphate without the production of elemental sulphur.

It is thus an aim of the present invention to provide a process for treating sulphide-containing water, which may, in particular, be that derived from the anaerobic sulphate reduction of acid mind drainage.

According to a first aspect of the invention, there is provided a process for treating sulphide-containing water, which process includes maintaining a steep redox potential gradient in an interface zone of the sulphide-containing water, with the water being exposed to an oxygen-containing environment and with the interface zone being located immediately below the surface of the water; and biologically oxidizing, in the interface zone, sulphides in the water to sulphur.

The process of the invention thus provides for the biotechnological treatment of sulphide-containing water, to remove sulphides, and yields substantial amounts of sulphur through bacterial oxidation of the sulphides to elemental sulphur. This permits use of a relatively simple solid/liquid separation operation ultimately to remove sulphur from the water.

The process has particular, but not exclusive, application in the treatment of sulphide-containing water derived from acid mine drainage which has been subjected to anaerobic sulphate reduction. The process of the invention can thus, in such an application, be considered to be a downstream unit process after an anaerobic sulphate reduction unit process, in a process for treating acid mine drainage, to remove sulphates therefrom.

This interface zone may be less than 1 cm deep or thick, and can typically be a few millimetres thick or even be of submillimetre or micron thickness.

The steep redox potential gradient is thus maintained across the very thin interface zone between fully oxidized surface water and substantially non-oxidized water below the interface zone, ie it is the difference in the redox potential of the water at its surface where it is saturated with oxygen and at a lower level below the interface zone where it is oxygen-depleted, ie where it contains little or no oxygen.

The biological oxidation of the sulphides to sulphur in the interface zone may be effected by means of sulphur producing bacteria, such as *Thiobacillus* or *Ectothiorhodospira* spp. The mechanism by means of which the biologically-mediated oxidation occurs involves polymerization of the sulphides to polysulphides in the presence of biologically produced sulphur, and the formation or growth of elemental sulphur on the polysulphide via a complex ($S_8$) intermediate. This occurs in a biofilm that forms on the surface of the water, ie at the top of the interface zone. The elemental sulphur that forms in the biofilm may be collected, eg by means of floating off the biofilm and by gravity settling. It is believed that the elemental sulphur formation mechanism involves heterotrophic metabolism within the biofilm which utilizes oxygen, creating the correct redox conditions for elemental sulphur formation.

Compared to the other oxidized forms of sulphur, elemental sulphur is formed in a narrow band of pE (redox) and pH conditions. It has been suggested that for a biological process, equilibrium thermodynamics have less of an influence on the major product of sulphide oxidation than kinetic considerations do.

Elemental sulphur is thus produced as a product of sulphide oxidation in a very narrow thermodynamic window. Organics present in the aqueous sulphidic environment act to buffer redox changes to poise the redox conditions such that sulphur is the predominant product of sulphide oxidation. This redox poising capacity reduces the stringency of control required to obtain sulphur as the predominant product of microbial sulphide oxidation.

The sulphide-containing water may thus also be organics rich, ie it may contain organic material. For example, the sulphide-containing water may originate from a biological sulphate reducing process for treating AMD and which makes use of a waste complex carbon or organic source, with a high sulphide organic rich effluent stream being produced, and with this stream being the feedstock of the present process. The complex carbon or organic source in the water will encourage bacterial growth and assist in creating the redox potential 'window' required for sulphur formation under bacterial conditions. Furthermore, facultative consumption of the organics material in the water ensures oxygen consumption at the water surface, ie at the top of the interface zone, and the establishment of a strongly negative redox potential in the water below the interface zone.

In one embodiment of the invention, the process may include feeding the sulphide-containing water into a reaction zone which is exposed to the atmosphere which thus provides the oxygen-containing environment; allowing the water to pass along the reaction zone, with the interface zone thus being at and/or near the surface of the water in the reaction zone; withdrawing the sulphur biofilm from the reaction zone; and withdrawing sulphide-depleted water from the reaction zone.

The reaction zone may be provided by a floating sulphur biofilm reactor having a water inlet zone at which the sulphide-containing water is introduced into the reactor and a water outlet zone at which the sulphide-depleted water is withdrawn from the reactor, with the withdrawal of the sulphide-depleting water being effected by allowing it to pass over an upper edge of a water weir provided in the water outlet zone, and thereafter exiting the reactor. Elemental sulphur forms as a layer associated with the floating film biofilm on the surface of the water in the reactor.

The maintenance of the steep redox potential gradient across the interface between the water and the atmosphere may include controlling the depth of the reaction zone. If the depth of the reaction zone is insufficient, then an inadequate redox potential gradient can result. The depth of the reaction zone may be controlled at 25 mm to 400 mm.

The depth of the reaction zone may be controlled by regulating the level of a floor of the reactor, ie moving it up or down and/or by regulating the level of the water weir, ie moving it up or down.

The redox potential gradient will also be influenced by the organic material content of the water and by the water flow rate. Thus, the maintenance of the steep redox potential gradient may instead, or additionally, include controlling the organic material content of the water and/or controlling the water flow rate into the reactor.

Still further, the maintenance of the steep redox potential gradient may instead, or additionally, include providing an aeration device in an upper region of the reaction zone, at or in proximity to the water inlet zone. The Applicant has found that because of growth of sulphur producing bacteria on the device and the availability of sulphur particles, the conversion of sulphides to polysulphides is enhanced, with subsequent conversion to sulphur taking place in the rest of the reactor. This mode of operation may be particularly beneficial when the conversion of sulphide to polysulphide is a limiting step with either too little polysulphide being produced or with too much oxygen being present, in which case the oxidation reaction proceeds too far and thiosulphate and sulphate are formed. The aeration device may comprise at least one air-fed tube located below the water surface. A plurality of the tubes, ie a bank of tubes, may be provided. The tubes may be of silicone.

The process may thus also include pretreating the water before it is introduced into the reactor, to form polysulphides therein, with the polysuiphide-rich water than being fed into the reactor. The pre-treatment of the water may then include passing it through a polysulphide production zone in which is located an aeration device as hereinbefore described.

The withdrawal of the sulphur biofilm may be effected in a controlled manner. The sulphur biofilm may thus be withdrawn when it undergoes a texture change from flexible to brittle. The amount of sulphur biofilm that is withdrawn may be such that at least 35% of the water surface is still covered by residual sulphur biofilm.

The withdrawal of the sulphur biofilm may be effected by allowing it to pass over an upper edge of a sulphur biofilm weir into a collection zone, from which it is withdrawn, with the upper edge of the sulphur biofilm weir being located at a higher level than the upper edge of the water weir.

A baffle may be provided between the sulphur biofilm weir and the water weir, to inhibit or prevent passage of the sulphur biofilm over the water weir.

In another embodiment of the invention, the process may include feeding the sulphide-containing water along a silicone tube, with the oxygen-containing environment being provided by the atmosphere around the outside of the tube and with the steep redox potential gradient being maintained across the tube wall so that the sulphur biofilm attaches to the inside of the silicone tube wall as an attached sulphur biofilm.

According to a second aspect of the invention, there is provided a reactor for treating sulphide-containing water, which reactor includes at least one wall and a floor defining between them a reaction zone which is open to the atmosphere;

water feed means for feeding sulphide-containing water into a water inlet zone of the reaction zone;

a water weir located in a water outlet zone spaced from the water inlet zone;

water withdrawal means for withdrawing water that has passed over the water weir;

a sulphur biofilm weir spaced from the water weir, with an upper edge of the sulphur biofilm weir being located at a higher level than an upper edge of the water weir; and sulphur biofilm withdrawal means for withdrawing sulphur biofilm that has passed over the sulphur biofilm weir.

A water collection trough may be provided alongside the water weir, with a water withdrawal conduit leading from the water collection trough, and with a valve, for controlling the rate of withdrawal of water, optionally being provided in the conduit.

A sulphur biofilm collection trough may be provided alongside the sulphur biofilm weir, with a sulphur biofilm withdrawal conduit leading from this trough, and with a valve, for controlling the rate of withdrawal of sulphur biofilm from the reaction zone, optionally being provided in this conduit.

The reactor may include a baffle located between the weirs.

The reactor may also include an aeration device, as hereinbefore described, at or in proximity to the water inlet zone.

The invention will now be described in more detail by way of non-limiting examples and with reference to the drawings.

Figure 1:
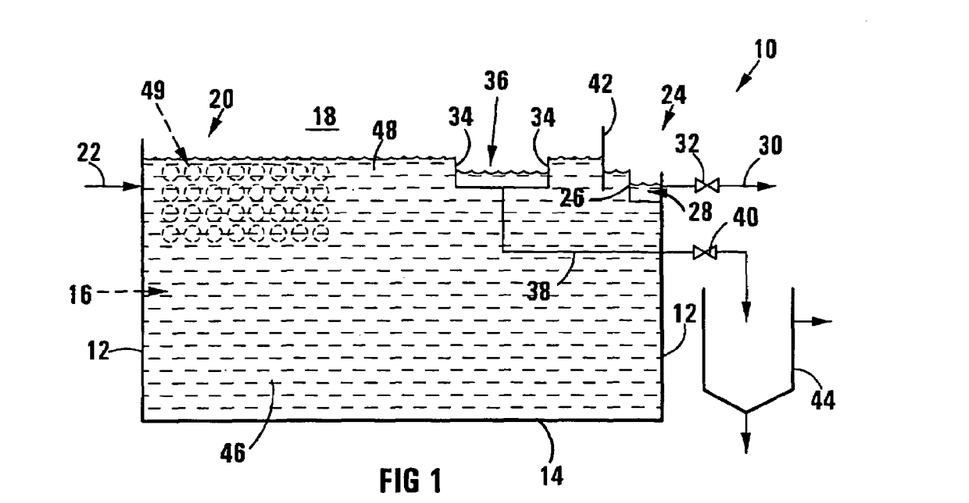
FIG. 1 shows, schematically, a longitudinal sectional view of a reactor in which the process of the invention can be carried out, in accordance with one embodiment of the invention.

Referring to FIG. 1, reference numeral 10 generally indicates a reactor in which a process for treating sulphide-containing water can be carried out, in accordance with one embodiment of the invention.

The reactor 10 includes side walls 12 and a floor 14, defining between them a reaction zone 16 which is open to the atmosphere 18.

The reactor 10 has a water inlet zone 20, with a water conduit 22 leading into the reactor at the water inlet zone 20.

The reactor 10 also includes a water outlet zone 24 spaced from the water inlet zone 20. At the water outlet zone 24, there is provided a water weir 26. A trough 28 is located alongside the weir 26, with a water withdrawal conduit 30 leading from the trough 28. A valve 32 is provided in the conduit 30.

Sulphur biofilm weirs 34 are provided in the reaction zone 16, with a trough 36 being provided alongside the weirs 34. A sulphur biofilm withdrawal conduit 38 leads from the trough 36 and is fitted with a valve 40.

A baffle 42 is located between the weirs 26, 34. An upper edge of the weir 26 is located at a lower level than upper edges of the weirs 34.

Sulphur biofilm withdrawn along the conduit 38 passes into a gravity settler 44.

In use, sulphide-containing water 46 enters the reaction zone 16 along the conduit 22. As it passes along the reaction zone 16 from the inlet zone 20 to the outlet zone 24, a steep redox potential gradient is established and maintained in a narrow or shallow interface zone 48 between the water surface and the bulk body of the sulphide-containing water below the interface zone 48 in the reactor, and which has a low redox potential. In the interface zone 48, which is thus located immediately below the surface of the water 46 in the reactor 10, biological oxidation of sulphides to elemental sulphur, across the steep redox potential (typically about −150 mV) that exists across the interface zone 48, occurs, with elemental sulphur forming as a floating biofilm (not shown) on the water surface. The biofilm typically has a thickness of 0.1-3 mm.

At the outlet zone 24, spent water, ie sulphide depleted water, passes underneath the baffle 42, over the upper edge of the weir 26 into the trough 28 from where it is removed along the line 30. By means of the valve 32, the rate of withdrawal of spent water can be controlled. The baffle 42 prevents the sulphur biofilm from passing into the trough 28.

The floating surface sulphur biofilm is withdrawn by passing over the upper edges of the weirs 34 into the trough 36 from where it is then withdrawn along the line 38 into the gravity settler 36 for separating solids from residual water.

By means of the valve 40, the rate of withdrawal of the sulphur biofilm can be controlled.

To maintain the steep redox potential gradient across the interface zone 48, ie the depth of the reaction zone 16, ie the depth of the water 46 in the reactor 10, is controlled. This depth can be controlled at between 25 mm and 400 mm, depending on the water sulphide concentration, the water flow rate and the COD load of the sulphide-containing water. The depth is controlled by adjusting the level of the floor 14 of the reactor 10, and/or by adjusting the level of the trough 28, ie the level of the upper edge of the weir 26.

By means of the valves 32, 40, which may be automated valves, the surface biofilm can be withdrawn at a desirable stage of formation and thickness. Thus, the biofilm is preferably withdrawn at the point at which it undergoes a textural change from flexible to brittle, which typically can occur around 4-8 hours between withdrawal or harvesting intervals. Preferably, sufficient sulphur biofilm is withdrawn or harvested so that at least 35% of the water surface area is still covered by biofilm, ie no more than 65% free water surface area should remain in the reactor 10. The Applicant has found that this ensures rapid reformation of the biofilm during the interharvest period, ie the period between withdrawal of biofilm. The automated valves 32, 40 facilitate this control.

It has been found that the solids harvested contain from 65%-75% (mass basis) elemental sulphur, with the balance being made up mainly of bacterial biomass and exopolymeric production. Additionally, the conversion of sulphide to elemental sulphur may be between 50%-93% (mass basis), depending on operational factors such as the water flow rate and the water sulphide load.

If desired, a bank of horizontal transverse air-fed silicone tubes 49 can be provided in the water inlet zone 20, in the upper portion of the reaction zone 16. As hereinbefore described, the Applicant has found that sulphur production can be enhanced, if the conversion of sulphide to polysulphide is a limiting step, by such an aeration device. This is as a result of growth of sulphur production bacteria on the tubes and the availability of sulphur particles, which enhances conversion of sulphides to polysulphides, with subsequent conversion to sulphur taking place in the remainder of the reactor.

Figure 2:
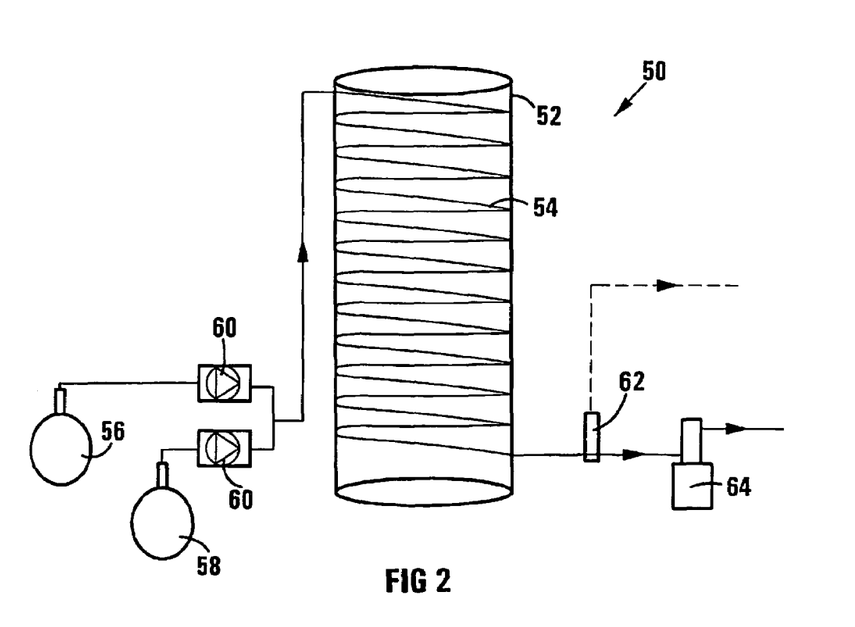
FIG. 2 shows, schematically, a reactor in which the process of the invention can be carried out, in accordance with another embodiment of the invention.

Referring to FIG. 2, reference numeral 50 generally indicates a reactor for carrying out the process of treating sulphide-containing water, according to a second embodiment of the invention.

The reactor 50 includes a plastic mesh frame 52 around which a length of silicone tubing 54 is wound. A silicone tubing of 8 mm (OD)/5 mm (ID) may be used.

An organic carbon source 56 as well as a sulphide source 58 are connected, via controllers 60, to an inlet end of the silicone tubing 54. The organic carbon source 56 may be sewage or any other carbon source capable of sustaining heterotrophic bacterial growth.

A redox probe 62 is fitted to an outlet end portion of the silicone tubing, and is connected to a PC (not shown). The outlet end portion of the silicone tubing leads into a settler 64.

The function of the reactor 50 will be described in Example 1 hereunder.

EXAMPLE 1

1.1 Reactor Configuration

The reactor 50 in this investigation consisted of a length of silicone tubing (13,2 m in length, 5 mm (ID)×8 mm (OD)). This gave a total reactor volume of 272 ml, and a hydraulic residence time (HRT) of 47 min at a flow rate of 5.8 ml.min$^{-1}$. The surface area of the reactor was calculated to be 2902 cm$^2$. A sulphide/sewage mix was fed to the reactor. The reactor was attached to a 2.5 m plastic mesh column by means of cable ties. The reactor was fed from the top downward.

The reactor was attached to the mesh frame so that a continual downward angle was maintained along the length of the reactor. This aimed to prevent settling along the length of the reactor and possibly encourage movement of produced sulphur down and out of the reactor and into the settling unit.

1.2 Reactor Operation 1.2.1 Reactor Start-Up

During this investigation a sulphide/sewage mixture was pumped through a clean piece of silicone tubing on the reactor 50. The aim was to determine how long it would take for a sulphide oxidizing population to develop and how the development of this population affected the aqueous chemistry of the fluid passing through the reactor. During this investigation the flow rate of the sulphide feed was adjusted during the initial 16 hour period of the investigation.

1.2.2 Biofilm Harvesting

Biofilm that developed in the reactor was collected by removing the tubing from the mesh frame, sealing both ends and rolling over the tubing with a large roller. The collected biofilm was freeze-dried, a known mass was resuspended in acetone and the sulphur content determined by HPLC as previously described.

1.2.3 Reactor Start-up after Biofilm Removal

The aim of this investigation was to compare how quickly a silicone reactor would begin to oxidize sulphide after the biofilm had been removed as described above. This investigation started directly after biofilm removal. The flow rate was maintained at 5.8 ml$^{-1}$.min$^{-1}$ throughout this investigation. In addition to this it was suspected that a deterioration in the sulphide oxidizing capacity of the reactor would occur as the biofilm thickness increased. This was probably due to a decrease in the efficiency of oxygen delivery to the biomass.

1.2.4 Particulate Collection

These investigations aimed to determine how much of this sloughed material could be collected under normal flow rate conditions, what percentage of the sloughed material was indeed elemental sulphur and if the sloughing process could be enhanced by periodically increasing the flow rate. The reactor was run until a well established film was present in the reactor. Particulate matter was collected in a flow-through cell over a period of 6 days. Particulate matter collected over a twenty four hour period was filtered through a dry Whatman GFC filter of known mass, dried at 60° C. overnight and the mass calculated by difference. Elemental sulphur presence was determined by cutting up the filter, and placing it in a suitable volume of acetone overnight. The concentration of elemental sulphur was determined by HPLC as described previously. The reactor was run for 6 days at the normal flow rate of 5.8 ml.min$^{-1}$ in order to determine the baseline amount of particulate matter in the effluent. After this six day period the reactor was run for the following 6 days under the following conditions: a programmable pump was used to increase the flow rate to maximum (125 ml.min$^{-1}$) for 1 min every 3 HRT's. This also meant that half of the hydraulic volume of the reactor would be replace with fresh feed every three HRT'S. The redox was measured and plotted during these investigations to determine how the reactor reacted to these upset conditions.

1.2.5 EM Studies on Reactor

The bacterial population present in the reactor was investigated by scanning electron microscopy. Sections from points at various lengths of the reactor were investigated. Six sections were removed and prepared from the reactor at 2-2.2 m intervals. The aim of these investigations was to determine whether any bacterial morphological differences were present in the microbial population along the length of the reactor. The reactor was run for 14 days until a thick biofilm was present. The reactor was then sacrificed and small sections of silicone were removed at approximately 2 m intervals along the reactor. These pieces were prepared for SEM as described hereinafter.

1.2.6 Light Microscopy Studies

Reactor effluent containing fragments of sloughed biofilm were viewed under phase contrast conditions at 400× on a light microscope. Effluent samples containing biofilm were heat-fixed on glass microscope slides, stained with methylene blue and observed on a phase contrast microscope.

1.2.7 Chemical Analyses

Chemicals used during all investigations were of analytical grade. Sulphide solutions were made by dissolving $Na_2S.9H_2O$ (Merck) in distilled water. The pH of this solution was adjusted using 32% $H_3PO_4$. The sewage used in all experiments was the supernatant from the primary settling tanks at the Grahamstown Municipal Sewage Works.

Sulphide, Sulphate, Elemental sulphur, pH, Redox were determined as follows:

Sulphide:

1 ml of sample was added to 1 ml of ZnAc. This was further diluted to give a final dilution of 1000×. Total sulphide in solution was then determined according to methylene blue method of Truper and Schlegel (1975)

Sulphate:

Sulphate concentrations were determined by ion exchange chromatography (IC) using a 15 mm×4.1 mm Hamilton PRP-X100 column, 4 mM p-hydroxybenzoic acid, 2.5% methanol, pH 8.5 as the mobile phase, Waters 510 pump flow rate 1 ml/min and detection by Waters 430 conductivity detector. Prior to ion exchange chromatography, samples filtered through 0.45 µm nylon filters and passed through a 25 mg $C_{18}$ Isolute® solid phase extraction column to remove contaminating organics.

Sulphur:

Elemental sulphur concentrations were determined using the modified procedure of Mockel (1984). Elemental sulphur was quantified using reversed phase HPLC using a Phenomenex® Luna 150 mm×4.6 mm C18 column, 95:5 $MeOH:H_2O$ mobile phase at a flow rate of 2 ml/min. 1 ml of sample was centrifuged at 13200 rpm for 10 minutes and the resulting pellet was resuspended in 1 ml of HPLC grade acetone, either filtered through a nylon 0.45 µm filter or recentrifuged before being run on the HPLC system.

ORP:

The oxidation/reduction potential (ORP) of the solution was determined using an Endress+Hauser® ORP probe connected to a data collection system. The data collection system sent data to a PC where it could be logged.

pH:

pH was determined using a Cyberscan 2000 pH meter.

TEM (transmission election microscopy) samples were prepared as follows:

Samples for TEM were prepared as described by Cross, ie 2 ml of reactor effluent was spun down in eppendorff tubes at 13000 rpm for 10 minutes. The pellets were pooled and spun down again at 13000 rpm for 10 minutes. The resulting pellet was prepared in the eppendorf tube for TEM according to the procedures described hereinafter.

Samples were prepared for electron microscopy following the methods of Cross (1979).

For transmission electron microscopy (TEM), following primary fixation in glutaradehyde, the samples were washed in 0.1 M phosphate buffer followed by post fixation for 90 minutes in 1% phosphate buffered osmium tetroxide. Following two further buffer washes the samples were dehydrated through a series of ascending concentrations of ethanol (30%-100%). This was followed by two washes in propylene oxide and transition to a resin medium through three propylene oxide:epoxy resin mixtures (75:25, 50:50, 25:75) and finally to pure epoxy resin. Samples were then transferred to pure epoxy resin and polymerization was allowed to take place over 36 hours at 60° C. Ultra thin sections of the resin embedded cells were cut using a LKB 111 ultramicrotome and collected on alcohol washed grids. The sections were then stained with 5% aqueous uranyl acetate (30 minutes), followed by Reynold's lead citrate (5 minutes).

Electron Microscopy

For TEM, ultrathin sections were examined using a JEOL JEM 100 CXII transmission electron microscope.

Preparation of Samples for Scanning Electron Microscopy

Immobilization media (PVC or Silicone) with attached biofilm were removed from the respective reactors. Immobilization medium and attached biofilm were carefully cut into small squares approximately 3 mm×3 mm with a sharp blade. These were prepared according to the method of Cross 1979. These biofilm containing pieces were then placed in cold buffered fixative (2.5% glutaraldehyde in 0.1 M phosphate buffer) overnight. The fixative was decanted off washed twice for fifteen minutes with cold 0.1 M phosphate buffer. The samples were then subjected to a step-wise increasing ethanol gradient (30% ethanol-100 ethanol) at 4° C. for 10 minutes at each ethanol concentration. The 100% ethanol step was repeated twice. The 100% ethanol was decanted off and the samples were placed in 75:25 ethanol:amyl acetate solution. The samples were eventually suspended in 100% amyl acetate via 50:50 and 25:75 ethanol: amyl acetate steps. The samples were placed in specially designed critical point drying baskets and were transferred, submerged in 100% amyl acetate, to the critical point drying apparatus. Samples then underwent critical point drying, were mounted on stubs and coated with gold. Samples that were not going to be observed immediately were stored in a dessicator.

Preparation of Samples for Light Microscopy

A small amount of reactor effluent, reactor influent, or biofilm present in the reactor would be transferred to a microscope slide using a flame-sterilized loop. The sample was spread with the loop and slowly heat fixed over a bunsen burner flame. Samples to be stained were then immersed in methylene blue for 30 s to one minute, washed with distilled water and allowed to air dry. Dry samples were observed using a light microscope with phase contrast ability.

1.3 Results

1.3.1 Reactor Start-Up

Figure 3:
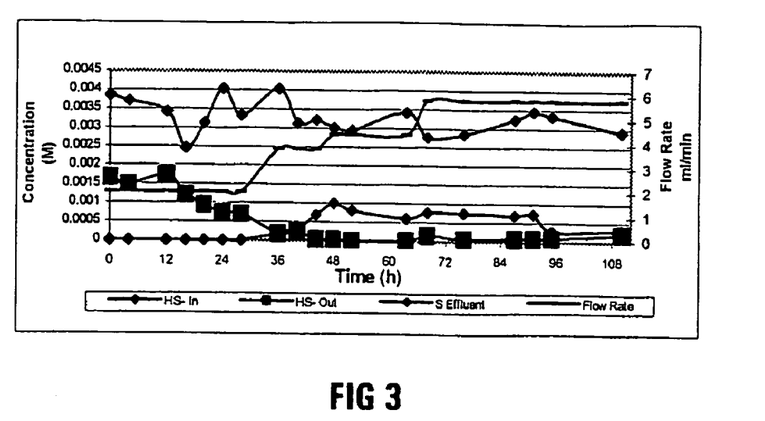
FIG. 3 shows, in respect of Example 1, ie using the reactor of FIG. 2, a plot of sulphide influent and effluent concentrations, sulphur effluent concentration and liquid flow rate against time, for the reactor 50 on start-up, using a fresh length of silicone tubing.
Figure 4:
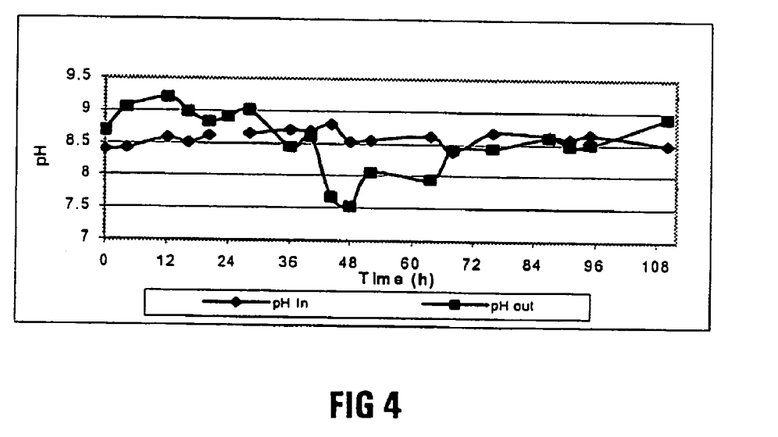
FIG. 4 shows, in respect of Example 1, a plot of influent and effluent pH measurements against time, during start-up of the reactor 50, using a fresh length of silicone tubing.

FIG. 3 shows the concentrations of influent sulphide, effluent sulphide and effluent elemental sulphur during the start-up of a clean silicone tube reactor. The measured pH of the influent and effluent are shown in FIG. 4. During the first 28 hours of this experiment the reactor was fed a sewage/sulphide mixed solution of sulphide concentration varying between 0.0025 and 0.004M (81-133 mg.$L^{-1}$), pH 8.5 and a flow rate of 2 ml.$min^{-1}$. During this stage the effluent contained 0.0017-0.0007 M (23-54 mg.$L^{-1}$) $HS^-$ at a pH of above 8.5. No elemental sulphur was detected in the effluent during the first 28 hours of operation. Between 28 and 44 hours the flow rate was increased to 3.8 ml.$min^{-1}$. At this point the concentration of sulphide in the effluent decreased dramatically, the effluent sulphide concentration at 36 hours was 0.0008M (6 mg.$L^{-1}$). During this time the effluent sulphur concentration increased to a maximum of 0.001 M (32 mg.$L^{-1}$). This corresponded to a decrease in the effluent pH to a minimum of 7.5. Sulphate concentrations were not determined during this start-up investigation.

Between 48 and 60 hours the reactor was run at 4.4 ml/min. During this time the sulphide concentration in the effluent remained low. The effluent sulphur concentration remained constant between 0.0006 and 0.0008 M (19-25.6 mg.$L^{-1}$) and the pH increased to 8. From 68 hours onwards the reactor was run at 5.8 ml.$min^{-1}$. Between 72 and 90 hours the elemental sulphur concentration in the effluent remained constant around 0.0007M (20 mg.$L^{-1}$) and the pH around 8.5, the effluent sulphide concentration remaining low until the sampling at 110 hours.

From 90 hours onwards sulphide was again present in the effluent and the sulphur concentration in the effluent decreased to below 0.0005M (16 mg.$L^{-1}$). The increase in the effluent sulphide concentration coincided with an increase of the effluent pH to 9. The maximum sulphide oxidizing rate during this start-up investigation was calculated to be $1.07 \times 10^{-3}$ $M.h^{-1}$.

A thick white biofilm was observed to have developed after 10 days of continuous reactor operation. After 10 days of operation, the biofilm was harvested. 5.54 g of total mass was harvested from the reactor of which 1.16 g (21%) was elemental sulphur. The freeze dried biofilm had a powdery off white appearance.

1.3.2 Reactor Running after Biofilm Harvesting

Figure 5:
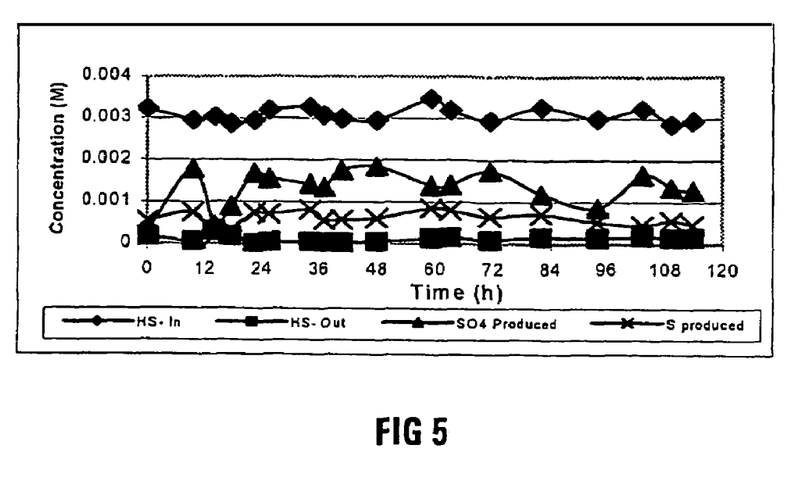
FIG. 5 shows, in respect of Example 1, a plot of influent and effluent sulphide concentrations, produced sulphate and effluent sulphur concentrations against time for the reactor 50, after it had been started up directly following removal of a previous biofilm.
Figure 6:
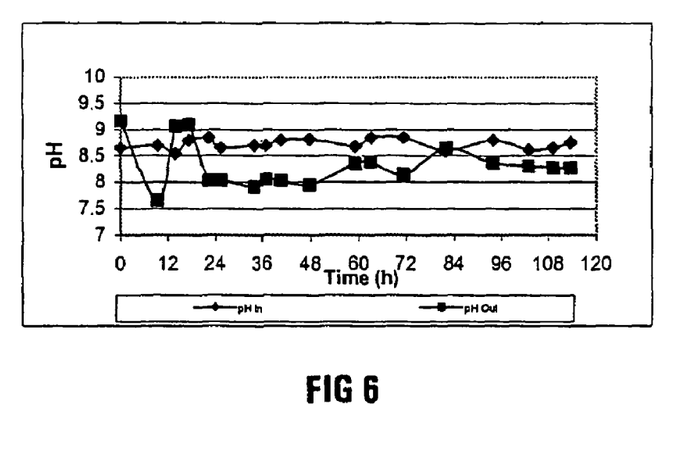
FIG. 6 shows, in respect of Example 1, a plot of influent and effluent pH measurements against time, during operation of the reactor 50, after it had been started up directly following removal of a previous biofilm.
Figure 7:
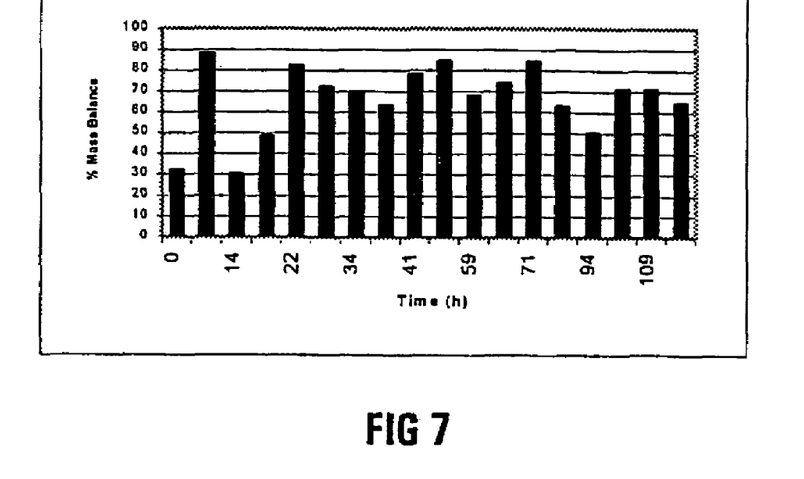
FIG. 7 shows, in respect of Example 1, a plot of percentage sulphur species recovery obtained against time, during operation of the reactor 50, after it had been started up directly following removal of a previous biofilm, and with percentage S species recovery=[$HS^-$]inf/[$SO_4^{2-}$]eff+[S]eff+[$HS^-$]eff)×100.

Influent sulphide, effluent sulphide, elemental sulphur and the produced sulphate (Produced sulphate=$[SO_4^{2-}]_{effluent} - [SO_4^{2-}]_{influent}$) were determined during the start-up of the reactor immediately after harvesting of a previous biofilm as shown in FIG. 5. The influent and effluent pH for the same period is shown in FIG. 6.

Re-starting the reactor after harvesting the previous biofilm at a flow rate of 5.8 ml.$min^{-1}$ at a sulphide concentration of 0.003M (100 mg.$L^{-1}$) resulted in immediate removal of all sulphide from the effluent. The first determination of sulphur species in the effluent was carried out after 1 hydraulic retention time and the effluent sulphide concentration was below 0.0018M HS (10 mg.$L^{-1}$). At t=0 (after 1 HRT) very little sulphate was detectable in the effluent and only a small amount of elemental sulphur detectable, although most of the sulphide had been removed. The sulphate concentration in the effluent then rapidly increased corresponding with a sharp drop in the effluent pH at 8 hours, this was followed by a drop in the effluent sulphate and elemental sulphur concentrations and a small increase in the effluent sulphide concentration.

Between 24 hours and 72 hours of operation a steady state seemed to be established. During this period sulphate produced (effluent-influent sulphate concentration) ranged between 0.0013 and 0.0017M (125 and 163 mg.$L^{-1}$), effluent elemental sulphur ranged between 0.0005 and 0.0008 M (16 and 26 mg.$L^{-1}$), and effluent pH was lower than the influent pH at about pH 8. During this stage above 60% of the predicted mass balance could be accounted for in terms of sulphate, elemental sulphur and sulphide. After 72 hours the pH of the effluent began to rise to above 8.5, sulphate in the effluent decreased dramatically, effluent sulphur began to decrease and more sulphide began to appear in the effluent. At 96 hours the sulphate concentration in the effluent again increase, but with no major decrease in the effluent pH.

1.3.3 Particulate Collection

Figure 8:
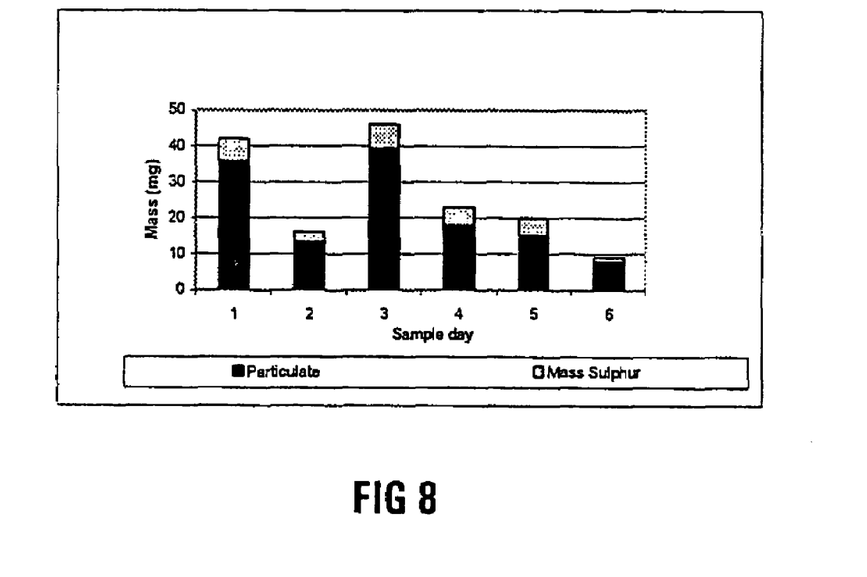
FIG. 8 shows, in respect of Example 1, a plot of the daily mass of particulates collected from the effluent and the proportion of the mass that was made up by sulphur against time, with the reactor 50 being run at 5.6 ml.min$^{-1}$.
Figure 9:
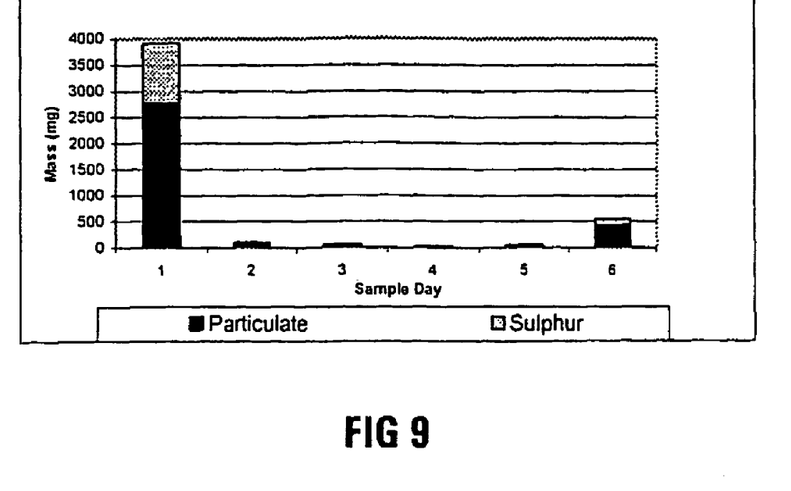
FIG. 9 shows, in respect of Example 1, a plot of the daily mass of particulates collected from effluent and the proportion of the mass that was made up by sulphur against time, with the reactor 50 being run with purging every 3 hydraulic retention times.

The mass of particulate matter collected over two six day periods as well as the portion present as elemental sulphur are shown in FIGS. 8 and 9 respectively. The amount of particulate matter collected from the reactor at a flow rate of 5.6 ml.$min^{-1}$ during the first six days of the experiment ranged between 9 and 46 mg (average 26+/–14.7) and the elemental sulphur present ranged between 1 and 6.5 mg (average 4.3+/–1.9 mg) (FIG. 8). The total sulphide load per day (assuming a constant sulphide concentration of 0.003 mM. $HS^-$, 100 mg.$L^{-1}$ at 5.6 ml.$min^{-1}$) was 806 mg.$day^{-1}$.

The amount of sulphur collected at 5.6 ml.$min^{-1}$ in the particulates from the reactor represented a very small portion of the total mass balance. Changing to a purge operation where the flow rate was increased to 125 ml/min for 1 minute every 3 hydraulic retention times resulted in a large amount of material being collected during the first 24 hours after changing to this operating regime. In the first 24 hours 3912 mg of particulate material was collected of which 1137 mg was determined to be elemental sulphur. On the following four days an average of 53+/–24.8 mg of which 10.6+/–7.25 mg was determined to be elemental sulphur. On the last day 550 mg of particulate matter was collected of which 110 mg of elemental sulphur was determined to be elemental sulphur.

1.3.4 Redox Changes During Purge Experiments

Figure 10:
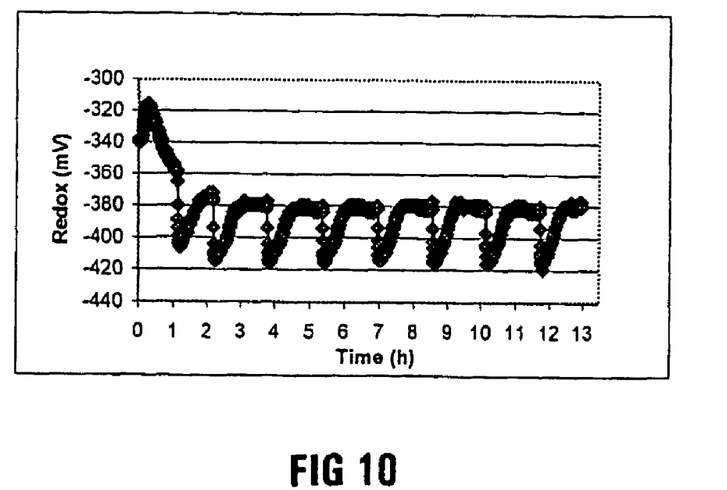
FIG. 10 shows, in respect of Example 1, a plot of measured redox potential against time, over a 13 hour period and with the reactor 50 being run with purging every 3 hydraulic retention times.
Figure 11:
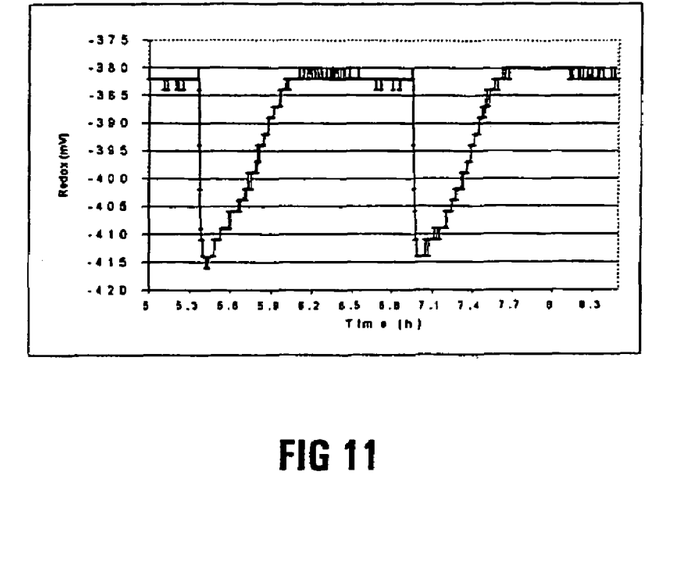
FIG. 11 shows, in respect of Example 1, a plot of measured redox potential against time, measured between 5 and 8.3 hours of the same experiment as for FIG. 10, highlighting the time taken for the reactor 50 to return to previous condition after purging.

The redox of the effluent was logged using an in-line redox probe during the particulate collection experiments. Results of the data collected when a 0.5 volume purge was employed every 3 hydraulic retention times are shown in FIGS. 10 and 11. FIG. 10 shows that throughout a 13 hour period the measured redox dropped whenever the reactor was purged, but returned to its previous level quite quickly. Closer examination of the redox profile after 1 purge event shows that the redox dropped from –382 to –415 mV quickly as the flow rate and sulphide loading are increased (at 5.35 hours) but returned to the previous level of –382 mV after 0.592 h (35.52 minutes) (see FIG. 11). The increased sulphide load did not affect the oxidizing capacity of the biomass once the load had washed out of the reactor.

1.3.5 EM and Light Studies on Population Present in Silicone Reactor

Scanning electron micrographs of the attached bacterial population present in the silicone tube reactor revealed the following:

1) A diverse bacterial biofilm developed on the tube wall. Examples of cocci, bacilli and filamentous organisms were noted;
2) The biofilm contained large amounts of a polymeric substance, probably exopolysaccharide;

3) Microbiologically produced elemental sulphur was observed only in sections from the first four meters of the reactor. The population present in this area was varied with a variety of bacteria exhibiting extracellular sulphur globules;
4) Areas of apparently single microbial morphology were noted;
5) Large crystals that appeared to be elemental sulphur were observed as part of the biofilm;
6) Possible evidence of the bacterial colonization of elemental sulphur was noted. Pitting of the large crystalline structures was noted;
7) Filamentous bacteria were not observed as a large component of the bacterial population in the reactor. Filamentous bacteria were observed near the end of the reactor. This is where the sulphide loading rate is lowest.

Phase Contrast Light Microscopy

Reactor effluent was viewed under phase contrast light microscopy at 400× magnification. In photographs of sloughed pieces of biofilm, elemental sulphur appeared as bright specks under phase contrast conditions. Elemental sulphur was observed to be present in a number of the biofilm fragments present in the reactor effluent. Bright white areas, consistent with the presence of elemental sulphur were observed. The sulphur seemed to be present within discrete areas of the biofilm fragments.

1.4 Discussion 1.4.1 Initial Reactor Start-up

The inability of the reactor to oxidize all the sulphide feed during the first 28 hours of operation using a clean section of silicone tubing is probably due to a lack of an attached biofilm. The rate of sulphide oxidation during the first 12 hours was $4.32 \times 10^{-4}$ M.h$^{-1}$ (8.1 mg.L$^{-1}$.h$^{-1}$) which compares well with the predicted initial chemical oxidation rate of a 100 mg.L$^{-1}$ HS$^-$ at an oxygen concentration of 3 mg/L. Silicone is hydrophobic in nature and this hydrophobicity needs to be overcome before attachment of a biofilm could take place. The disappearance of sulphide from the effluent at 28 hours is indicative of the development of an attached microbial population able to oxidize sulphide. Previous observations would suggest that the decrease in pH was associated with an increase in the sulphate concentration of the reactor effluent and that sufficient oxygen was being delivered to the biomass for the complete oxidation of sulphide to sulphate.

The chemical observations can be explained in a summarized form as follows:

During the initial 36 hours sulphide oxidation was inefficient and probably took place as a result of chemical oxidation. Initial colonization of the silicone tube surface is slow due to the hydrophobic nature of the silicone surface. It is believed that this drawback is then overcome by the formation of a conditioning film prior to the adhesion of the arriving microorganisms. It is also believed that this conditioning film masks the physico-chemical properties of the substratum surface.

Between 36 and 48 hours sulphide disappears from the effluent, elemental sulphur concentration in the effluent increases and the pH of the effluent decreases. This is probably due to the establishment of a sulphide oxidizing biofilm on the silicone surface and a sulphide loading rate of the reactor which allowed for delivery of sufficient oxygen to the biomass so that sulphate could be produced (explaining the decrease in effluent pH). The loading rate applied during this stage of reactor running resulted in a steady increase in the effluent sulphur concentration and should be noted for future reference. The following is proposed as a meaningful expression of sulphide loading rate for a silicone tubular reactor and is expressed for a reactor with wall thickness of 1.5 mm:

Sulphide loading rate=Molar HS$^-$×Flow Rate/Reactor volume/Reactor Surface Area.

At a feed concentration of 0.0035M HS$^-$, at 3.8 ml.min$^{-1}$ in a reactor of length 1320 cm ID 5 mm and OD 8 mm the loading rate is $7.5 \times 10^7$ mol.L$^{-1}$.h$^{-1}$.cm$^{-2}$.

1.4.2 Reactor Start-up after Biofilm Harvesting

Starting up the reactor immediately after removal of a previous biofilm resulted in sulphide being virtually undetectable in the effluent after the first hydraulic retention time This was probably due to the presence of small amounts of residual biofilm that was not completely removed during the biofilm harvesting process. The residual bacterial population present in the unremoved biofilm was able to immediately begin oxidation of the sulphide. In addition to this the reactor was probably able to develop a new biofilm faster than fresh tubing due to the presence of an attached polymer layer (also referred to as a conditioning film) that was not removed during the biofilm harvesting. These polymers decrease the hydrophobicity of the silicone tubing and aid in the attachment of suitable organisms from the reactor feed. It is also possible that a small amount of residual sulphur was present in the tube. The presence of this sulphur could react with the sulphide to produce polysulphides.

It is probable that the reactor will initially be in a state of flux in terms of microbial population with the following parameters contributing to the selection of the predominant bacterial population in any given area of the reactor:
1) Sulphide Loading Rate {mol HS$^-$.L$^{-1}$ (unit reactor volume). h$^{-1}$ (time). cm$^2$ surface area)};
2) Organics concentration;
3) Type of organics present;

Towards the end of this investigation sulphide again began to appear in the reactor effluent. This would suggest that the amount of oxygen available to the biomass for oxidation had decreased. This could possibly be due to deposition of elemental sulphur within the biofilm and an increase in overall biofilm thickness. This would explain the increase in pH during this stage of the reactor operation. The increase in sulphate concentration in the effluent could possibly be due to development of a new sulphide oxidizing biofilm within the reactor.

Conceptually a sulphide loading rate needs to be determined above which autotrophic bacteria have a selective advantage over their heterotrophic sulphide oxidizing counterparts and oxygen needs to be supplied to this population at a molar O$_2$:HS— consumption ratio above which reduction of oxidized sulphur species is inhibited and below which sulphate is a major product of sulphur oxidation.

A meaningful sulphide loading rate for this type of reactor where oxygen is supplied chiefly by diffusion of oxygen through the reactor wall.

Oxygen permeability (P) is defined as

P=DS

D=Diffusion coefficient

S=Solubility coefficient

Oxygen flux may be calculated according to the following equation:

$$J = -DS(\Delta c/d)$$

Where DS=permeability coefficient
Δc=concentration difference on either side of the membrane
d=membrane thickness Since the membrane thickness is constant for the length of the reactor, the oxygen flux into the reactor will predominantly be determined by the concentration of oxygen within the biofilm at the biofilm/silicone interface. The maximal amount of oxygen which may be supplied to the reactor will be determined by the surface area of the reactor, the surface area of the reactor will be determined by the length of the reactor multiplied by the average circumference of the reactor tube.

1.4.3 Particulate Collection

The profile of collected particulates suggests that sloughing events do occur with large sections of the biofilm being displaced from the reactor wall from time to time. Interestingly the ratio of sulphur mass to total particulate mass of the material collected seemed to be quite stable at 1:5, indicating that the biomass associated with the biofilm has a maximum elemental sulphur holding capacity. This maximum capacity may be determined by cycling of sulphur compounds within the biofilm and between the biofilm and the bulk phase.

1.4.4 EM and Light Microscopy Studies

These studies showed that possibly two general types of elemental sulphur were present in the reactor, namely biologically produced sulphur associated with bacterial growth in the upper sections of the reactor and crystalline sulphur present in the middle regions of the reactor. The presence of these extracellular sulphur globules was taken as an indication of autotrophic metabolism. Autotrophic metabolism can be considered to be a selective advantage at high sulphide loading rates. The highest sulphide concentrations are expected to occur within the upper sections of the reactor and hence this part of the reactor selects for an autotrophic population. It is possible that the biologically produced sulphur from the upper regions of the reactor acts as a catalyst for sulphur crystallization further down the reactor. This could be determined by determining the amount the relative amounts of sulphur at different lengths along the reactor.

Pumping a non-sterile organics and sulphide-containing solution through silicone tubing results in the selection of an attached bacterial biofilm capable of oxidizing the sulphide, with sulphur being a major component of the oxidation product. Evidence to suggest that that the oxidation is bacterially mediated was the lag time between reactor start-up and the time at which all sulphide was removed from the liquid stream. This is consistent with the development of a bacterial population on the reactor wall. The rate of sulphide oxidation after reactor start-up was significantly quicker than that predicted for chemical oxidation. The highest sulphide oxidation rate was $1.07 \times 10^{-3}$ $M.h^{-1}$ (35 $mg.L^{-1}.h^{-1}$), which is (4×) higher than the predicted chemical oxidation rate. Start-up of the reactor was significantly quicker when a reactor from which the previous biofilm had recently been removed. This was ascribed to the presence of a polymeric layer on the tube surface enabling bacterial attachment, incomplete removal of previous bacterial biofilm, and presence of elemental sulphur promoting the formation of polysulphides.

An autotrophic bacterial population was demonstrated to have developed in discrete areas of the reactor. The autotrophic population was observed by scanning electron microscopy close to the top of the reactor where the highest sulphide-loading rate and highest sulphide concentrations occur. In addition to this another form of sulphur possibly orthorhombic crystalline sulphur was observed further down the length of the reactor suggesting that biological sulphur production may enhance sulphur crystallization at a point further along the reactor. Light microscopy evidence also suggested that elemental sulphur production occurred within discrete areas of the biofilm itself.

The trickle filter and drowned trickle filter that were investigated prior to the silicone tube reactor both had the disadvantage of inability to control the oxygen supply to the sulphide oxidizing zones of the reactors resulting in very little sulphur being produced as a product of sulphide oxidation. Furthermore the development of filamentous sulphur accumulating organisms was shown to occur which could not be easily removed once established within the reactor. Due to the oxygen permeability and flexibility of silicone, an environment seems to be created in which sulphur can be produced biologically and the possibility exists where filamentous populations can easily be removed from the tubing periodically, possibly enhancing the sulphur recovery process.

The results obtained show that a reactor based on tubular silicone offers potential as a configuration for the biotechnological removal of sulphide as sulphur from treated AMD. Biological sulphur production is dependent on the provision of very specific conditions that demand that strict process control be employed. Strict process control measures such as those based on maintaining a predetermined redox set point would not be applicable in a passive treatment system. The chemical characteristics of silicone and its oxygen permeability in particular, in addition to the bacterial growth that occurs on these silicone surfaces seem to be able to provide an environment in which this strict control is not required. This suggests that a reactor that meets the criteria of a passive treatment system may be developed using tubular silicone. Development of such a system will be dependent on determining the optimal relationship between sulphide load and reactor volume in relation to the silicone tube wall thickness and the development of strategies for the harvesting of sulphur from the reactor that fit the definition of a passive system.

Physico-chemical methods for treating sulphide-containing gas and liquid streams require large investments and high operating costs due to the high pressures, high temperatures and speciality chemicals utilized in these processes. Microbial Oxidation of sulphide is carried out at ambient temperature and pressure resulting in reduced energy costs and represents a feasible alternative to these physicochemical processes. In addition to lower energy costs, microbial oxidation is not dependant on the addition of hazardous chemicals, reducing the impact on the environment that these processes might have. Biological sulphide oxidation processes employ sulphide oxidizing bacteria to oxidize sulphide.

In addition to sulphide, *Thiobacillus* spp. can oxidize elemental sulphur, thiosulphate and other reduced sulphur compounds that are common intermediates during sulphide oxidation in the natural environment. Sulphide oxidizing bacteria have to compete with the chemical oxidation of sulphide and are therefore often found in gradients at the interface between anoxic (sulphide rich) sediments and aerobic waters or anaerobic waters and the atmosphere. At the lower oxygen concentrations the bacteria can effectively compete with the chemical oxidation of sulphide. In natural environments complex interactions occur between photosynthetic sulphur bacteria, the colourless sulphur bacteria and sulphate reducing bacteria.

Bacterial population studies were carried out on the biofilms that were obtained in the experiments that were conducted, and the bacterial community structure determined by molecular techniques including total genome DNA extraction, PCR, DGGE, DNA sequencing and 16S rRNA based phylogenetic analysis. These analyses showed *Pseudonomas* and *Bacillus* spp. predominated among the facultative population components, and the *Thiobacillus* and *Ectothiorhodospira* formed the major sulphur producing species.

Figure 12:
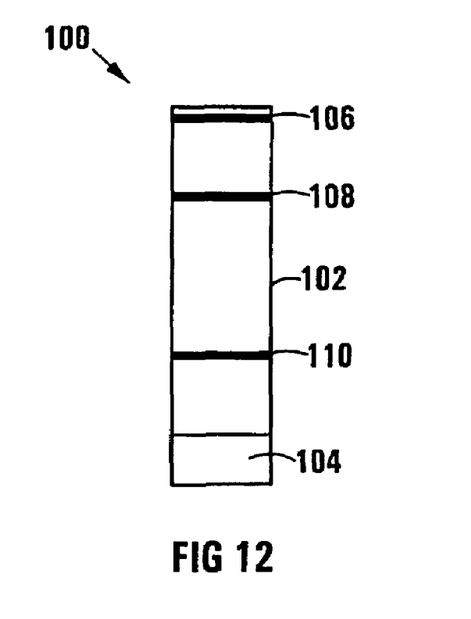
FIG. 12 shows, diagrammatically, the biofilm obtained in the reactors 10, 50, in expanded format.

A tube test methodology, as depicted in FIG. 12, was designed to effect expansion of the biofilm so that the occurrence of the different components making up the biofilm could be measured across a greater length than the few millimetres thickness of the biofilm. This was done by placing a sulphide-containing agar plug 104 at the base of a test tube 102, and then overlaying the plug with agar in which a homogenized sample of the biofilm was suspended. In this way a gradient of sulphide was established from bottom to top, and an oxygen gradient from top to bottom. It was found that aerobic and facultative organisms grew in bands 106 in the upper layers of the biofilms, while sulphur producing organisms grew in middle layers 108. Anaerobic organisms grew in bottom layers 110 located in proximity to the base of the test tube.

The Applicant found that the manner in which the biofilms form are specific to the manner in which the reactors were managed. The process by which the biofilm forms is as follows:

Aerobic and facultative organisms establish at the surface of the water layer, and due to a range of factors commence a secretion of exopolymeric substances which float and create a thin biofilm on the water surface;

Oxygen consumption at the surface by these organisms acts to establish the appropriate redox gradient;

Bacteria producing external deposits of sulphur granules on the cell surface start to proliferate just below the biofilm and at the layer within the appropriate redox window;

Here the polymerization of sulphide is catalyzed by elemental sulphur to form polysulphide chains. These accumulate and then concatenate to form $S_8$ particles, which in turn aggregate and accumulate in a manner producing an amorphose film of sulphur particles;

The sulphur particles adhere to the floating film and due to surface tension interactions contribute to its overall stability and structure. In this way the film thickens and appears to grow in a manner analogous to crystal growth.

Biologically produced sulphur is hydrophilic in nature and is white to pale yellow in colour. The hydrophilic nature of has been ascribed to the covering of the hydrophobic sulphur particles with an extended polymer layer. Biologically produced sulphur globules eventually convert to crystalline $S_8$ when allowed to stand. The polymer layer surrounding biologically produced sulphur particles has been described as most likely being composed of protein for sulphur produced by *Thiobacilli*.

A biological sulphate reducing process to treat AMD will require the use of a waste complex carbon source due to the prohibitive costs of using a refined carbon source to treat the large volumes that may be expected for AMD. The use of a complex carbon source is likely to result in a high sulphide organic rich effluent stream. Due to the extremely toxic nature of sulphides, a process to remove sulphide from the liquid stream will be required. The present invention provides such a process.

The process of the present invention provides for removal of the sulphides by oxidation to elemental sulphur. This reduces the total sulphur pollution in the water, and the sulphur may be recovered and either sold as a value-added product or used in processes such as bio-leaching.

A number of physico-chemical methods have been developed to convert sulphide to elemental sulphur. These processes are often energy intensive and require strict process control, require the addition of potentially polluting chemicals and often produce noxious secondary sludges that require special disposal. Biological sulphide oxidation in accordance with the present invention presents a viable alternative to these physicochemical processes. Biological sulphide oxidation occurs at ambient temperatures and pressures. Biological processes utilizing both phototrophic and colourless sulphide oxidizing bacteria have been developed. Processes utilizing phototrophic sulphide oxidizing bacteria have the disadvantage of requiring a constant radiant energy source that is difficult to supply under turbid culture conditions. Colourless sulphur bacteria have been used in biological sulphide oxidation processes.

The majority of processes utilizing colourless sulphide oxidizing bacteria have been developed to treat relatively pure sulphide solutions that are virtually devoid of contaminating organics with reactors being run under autotrophic conditions.

From literature discussions on these processes, the following challenges were addressed in developing the biological sulphide oxidizing process in accordance with the invention, and in which elemental sulphur is the major product:

1) Elemental sulphur is the major product of sulphide oxidation under very specific redox and pH conditions. Biotechnological processes have historically needed to be controlled rigorously to prevent complete oxidation of sulphide to sulphate;

2) The presence of organics in a sulphidic environment encourages the growth of filamentous sulphur bacteria. These bacteria especially Thiothrix, accumulate sulphur intracellularly and oxidize it further to sulphate when redox conditions allow for this to occur;

3) The presence of organics (carbon) and partially oxidized and oxidized sulphur compounds (thiosulphate, sulphur and sulphate) and anaerobic conditions will encourage the growth of sulphate reducing bacteria. The presence of active bacterial sulphate reduction in a sulphide oxidizing bioreactor is a disadvantage since the overall sulphide removal capacity will be decreased. Sulphate reduction has been shown to take place in aerobic biofilms;

4) Biological sulphur is produced as amorphous sulphur covered in a layer of organic molecules. This organic layer renders the sulphur hydrophilic and this sulphur tends to form stable colloidal sols. This makes recovery of the sulphur, by settling difficult.

A need therefore existed to develop and evaluate a biotechnological approach to oxidation of sulphide to elemental sulphur in an organics rich environment. The present invention thus satisfies this need.

The invention claimed is:

1. A process for treating sulphide-containing water, which process includes
   maintaining, in the sulphide-containing water, a redox potential gradient across an interface zone between oxidized surface water and substantially non-oxidized water below the interface zone, with the water being exposed to the atmosphere which provides an oxygen-containing environment and with the interface zone being located below the surface of the water; and biologically oxidizing, in the interface zone, sulphides in the water to sulphur.

2. A process according to claim 1, wherein the interface zone is less than 1 cm deep.

3. A process according to claim 1, wherein the redox potential gradient in the interface zone is between +100 mV and −200 mV.

4. A process according to claim 3, wherein the redox potential gradient in the interface zone is about −150 mV.

5. A process according to claim 1, wherein the biological oxidation of the sulphides to sulphur in the interface zone is effected by means of sulphur producing bacteria, with a sulphur biofilm comprising the sulphur producing bacteria and the sulphur forming on the surface of the water.

6. A process according to claim 5, wherein the sulphide-containing water also contains organic material which assists in bacterial growth and in creating redox potential conditions required for bacterial sulphur formation.

7. A process according to claim 6, which includes feeding the sulphide-containing water into a reaction zone that is exposed to the atmosphere which thus provides the oxygen-containing environment; allowing the water to pass along the reaction zone, with the interface zone thus being at and/or near the surface of the water in the reaction zone; withdrawing the sulphur biofilm from the reaction zone; and withdrawing sulphide-depleted water from the reaction zone.

8. A process according to claim 7, wherein the reaction zone is provided by a reactor having a water inlet zone at which the sulphide-containing water is introduced into the reactor and a water outlet zone at which the sulphide-depleted water is withdrawn from the reactor, with the withdrawal of the sulphide-depleting water being effected by allowing it to pass over an upper edge of a water weir provided in the water outlet zone, and thereafter exiting the reactor.

9. A process according to claim 8, wherein the maintenance of the redox potential gradient in the interface zone includes controlling the depth of the reaction zone.

10. A process according to claim 9, wherein the depth of the reaction zone is controlled at between 25 mm and 400 mm.

11. A process according to claim 9, wherein the depth of the reaction zone is controlled by regulating the level of a floor of the reactor and/or by regulating the level of the water weir.

12. A process according to claim 8, wherein the maintenance of the redox potential gradient in the interface zone includes controlling the organic material content of the water and/or controlling the water flow rate into the reactor.

13. A process according to claim 8, wherein the maintenance of the redox potential gradient in the interface zone includes providing an aeration device in an upper region of the reaction zone at or in proximity to the water inlet zone.

14. A process according to claim 13, wherein the aeration device comprises at least one air-fed silicone tube located below the surface of the water.

15. A process according to claim 8, which includes pretreating the water before it is introduced into the reactor, to form polysulphides therein, which includes passing the water through a polysulphide production zone in which is located an aeration device, and thereafter introducing the pretreated water into the reactor.

16. A process according to claim 15, wherein the aeration device comprises at least one air-fed silicone tube located below the water surface in the polysulphide production zone.

17. A process according to claim 8, wherein the withdrawal of the sulphur biofilm is effected in a controlled manner.

18. A process according to claim 17, wherein the sulphur biofilm is withdrawn when it undergoes a texture change from flexible to brittle.

19. A process according to claim 17, wherein the amount of sulphur biofilm that is withdrawn is such that at least 35% of the water surface is still covered by residual sulphur biofilm.

20. A process according to claim 17, wherein the withdrawal of the sulphur biofilm is effected by allowing it to pass over an upper edge of a sulphur biofilm weir into a collection zone, from which it is withdrawn, with the upper edge of the sulphur biofilm weir being located at a higher level than the upper edge of the water weir.

21. A process according to claim 20, which includes providing a baffle between the sulphur biofilm weir and the water weir, to inhibit or prevent passage of the sulphur biofilm over the water weir.

22. A process according to claim 5, which includes feeding the sulphide containing water along a silicone tube, with the oxygen-containing environment being provided by the atmosphere around the outside of the tube and with the redox potential gradient being maintained across the tube wall so that the sulphur biofilm attaches to the inside of the silicone tube wall.

23. A process for treating sulphide-containing water, which process includes maintaining a redox potential gradient in an interface zone of the sulphide-containing water, with the water being exposed to the atmosphere which provides an oxygen-containing environment, and with the interface zone being located below the surface of the water;

biologically oxidizing, in the interface zone, sulphides in the water to sulphur;

allowing a biofilm containing the sulphur to form on the surface of the water above the interface zone; and withdrawing the sulphur biofilm.

24. A process for treating sulphide- and organic material-containing water, which process includes introducing the sulphide- and organic material-containing water into a water inlet zone of a reactor providing a reaction zone that is exposed to the atmosphere which thus provides an oxygen-containing environment;

allowing the water to pass along the reaction zone;

controlling the depth of the reaction zone at between 25 mm and 400 mm, thereby maintaining a redox potential gradient in an interface zone at and/or near the surface of the water in the reaction zone;

biologically oxidizing, in the interface zone, sulphides in the water to sulphur by means of sulphur producing bacteria, with a sulphur biofilm comprising the sulphur producing bacterial and the sulphur forming on the surface of the water, and with the organic material in the water assisting in bacterial growth and in creating redox potential conditions required for bacterial sulphur formation;

withdrawing the sulphur biofilm from the reaction zone; and withdrawing sulphide-depleted water from a water outlet zone of the reactor by allowing it to pass over an upper edge of a water weir provided in the water outlet zone, and thereafter exiting the reactor.

* * * * *